June 7, 1960 G. T. RONK 2,939,226
ELEVATING GRADERS
Filed Nov. 2, 1956 13 Sheets-Sheet 1

Inventor.
Geo. T. Ronk.
By Eugene H. Simpson.
Attorney.

June 7, 1960  G. T. RONK  2,939,226
ELEVATING GRADERS
Filed Nov. 2, 1956  13 Sheets-Sheet 4

Inventor:
Geo. T. Ronk.
By. Eugene W. Simpson.
Attorney.

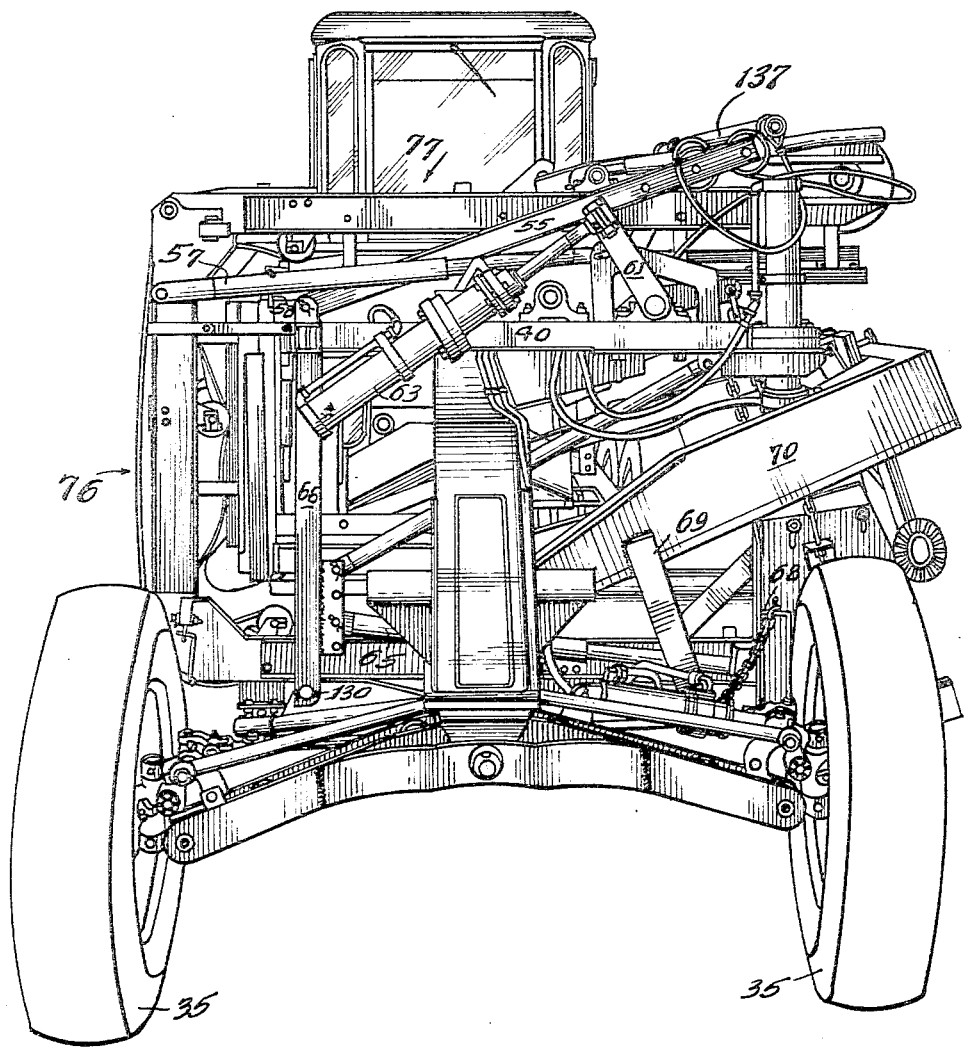

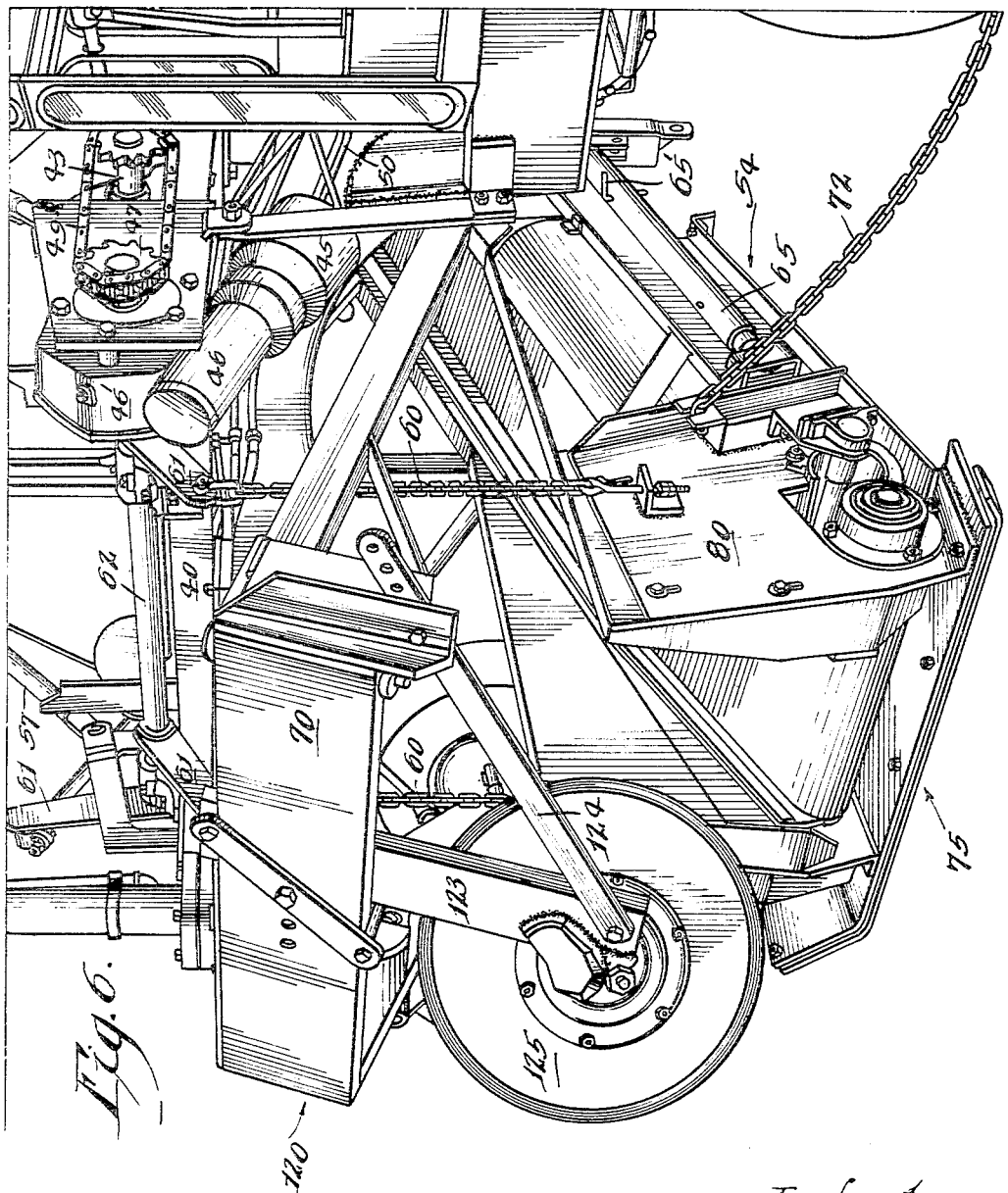

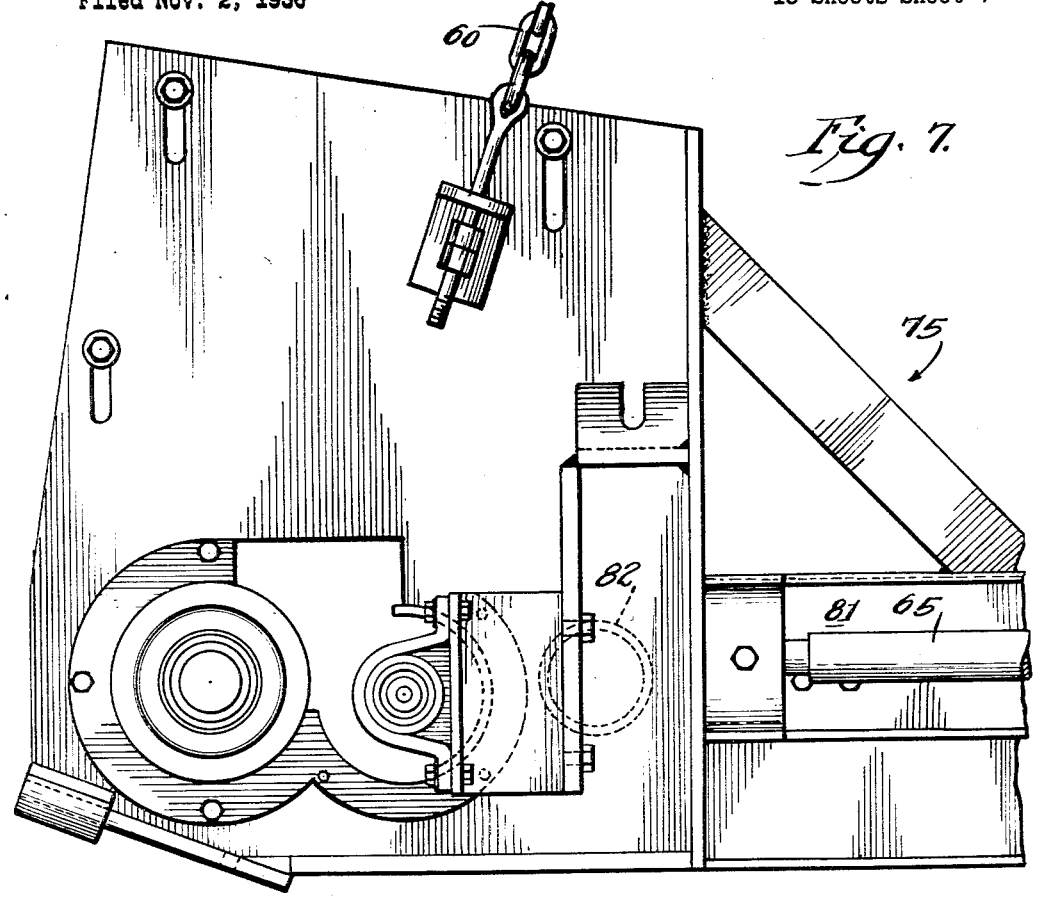
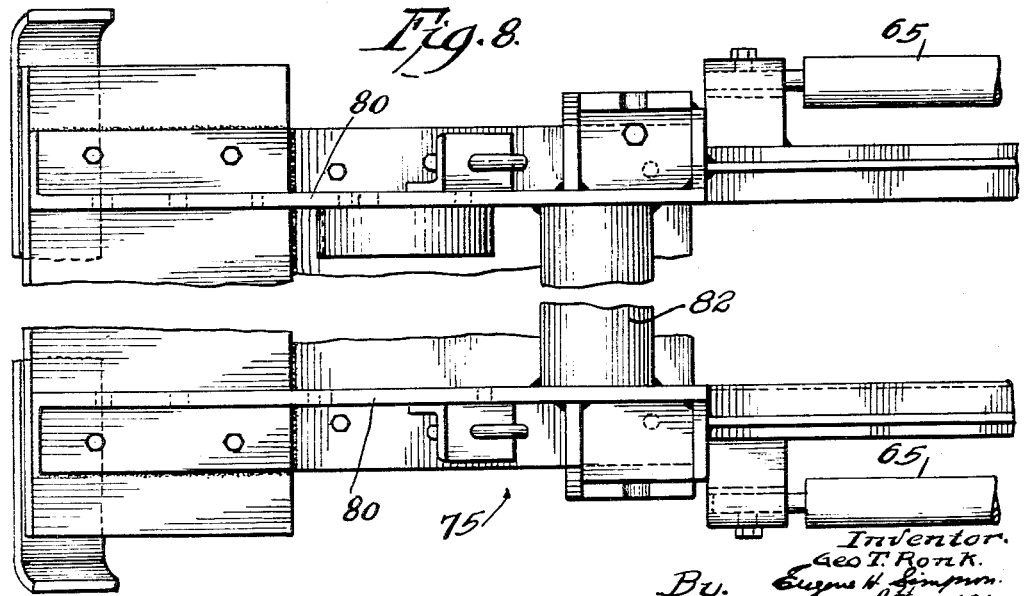

June 7, 1960 G. T. RONK 2,939,226
ELEVATING GRADERS
Filed Nov. 2, 1956 13 Sheets-Sheet 8
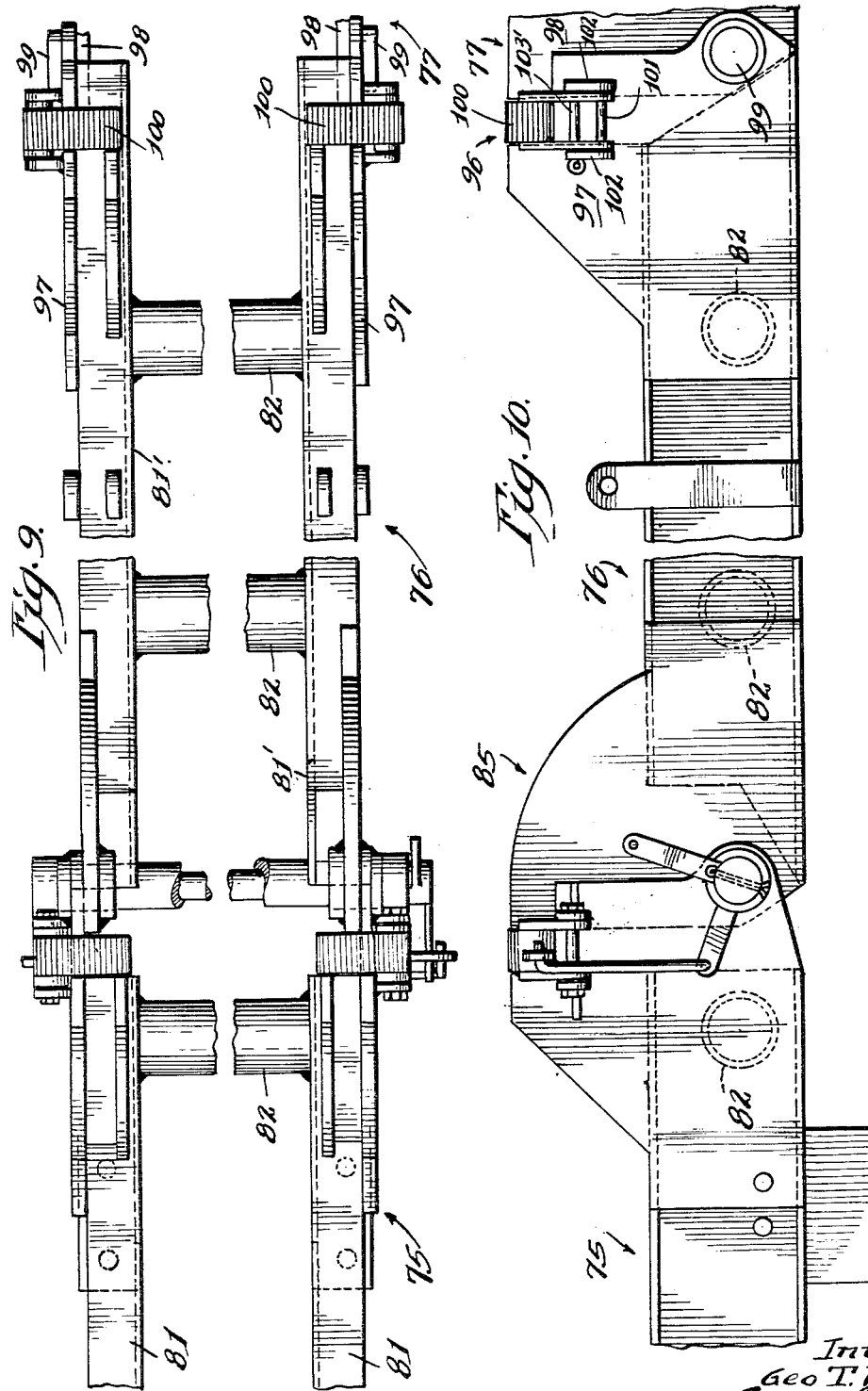
Inventor:
Geo T. Ronk.
By Eugene H. Simpson
Attorney.

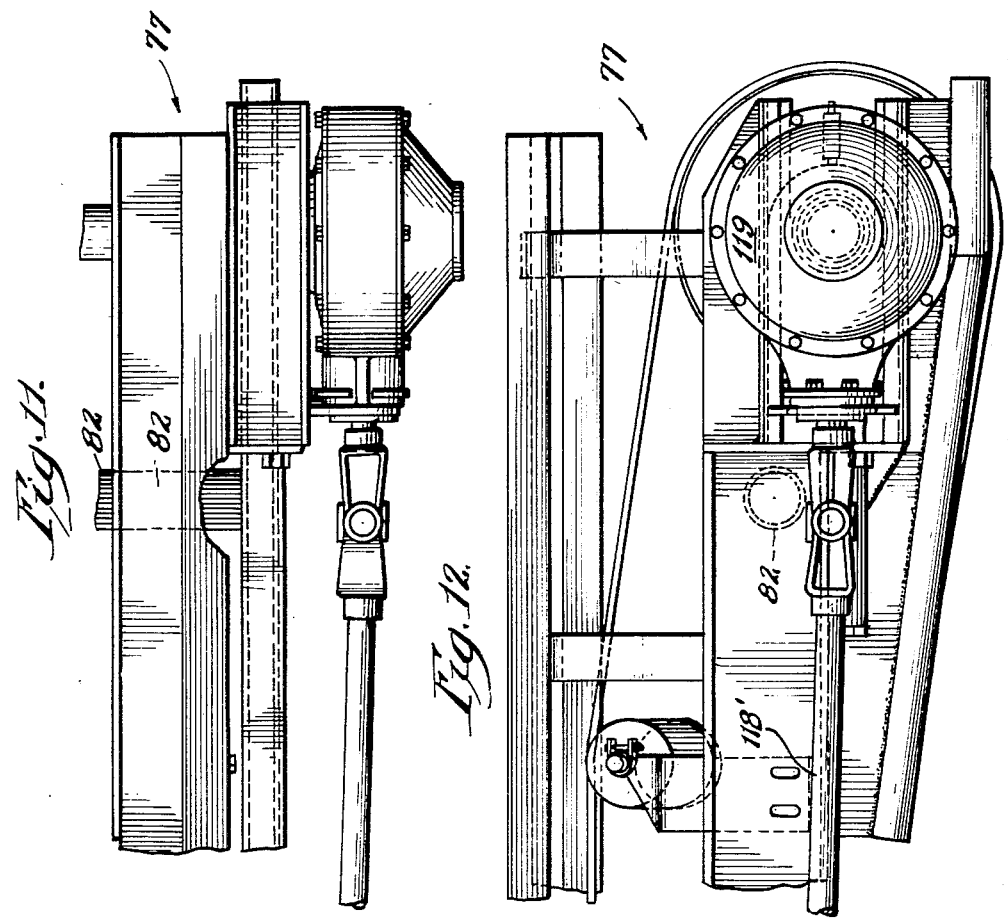

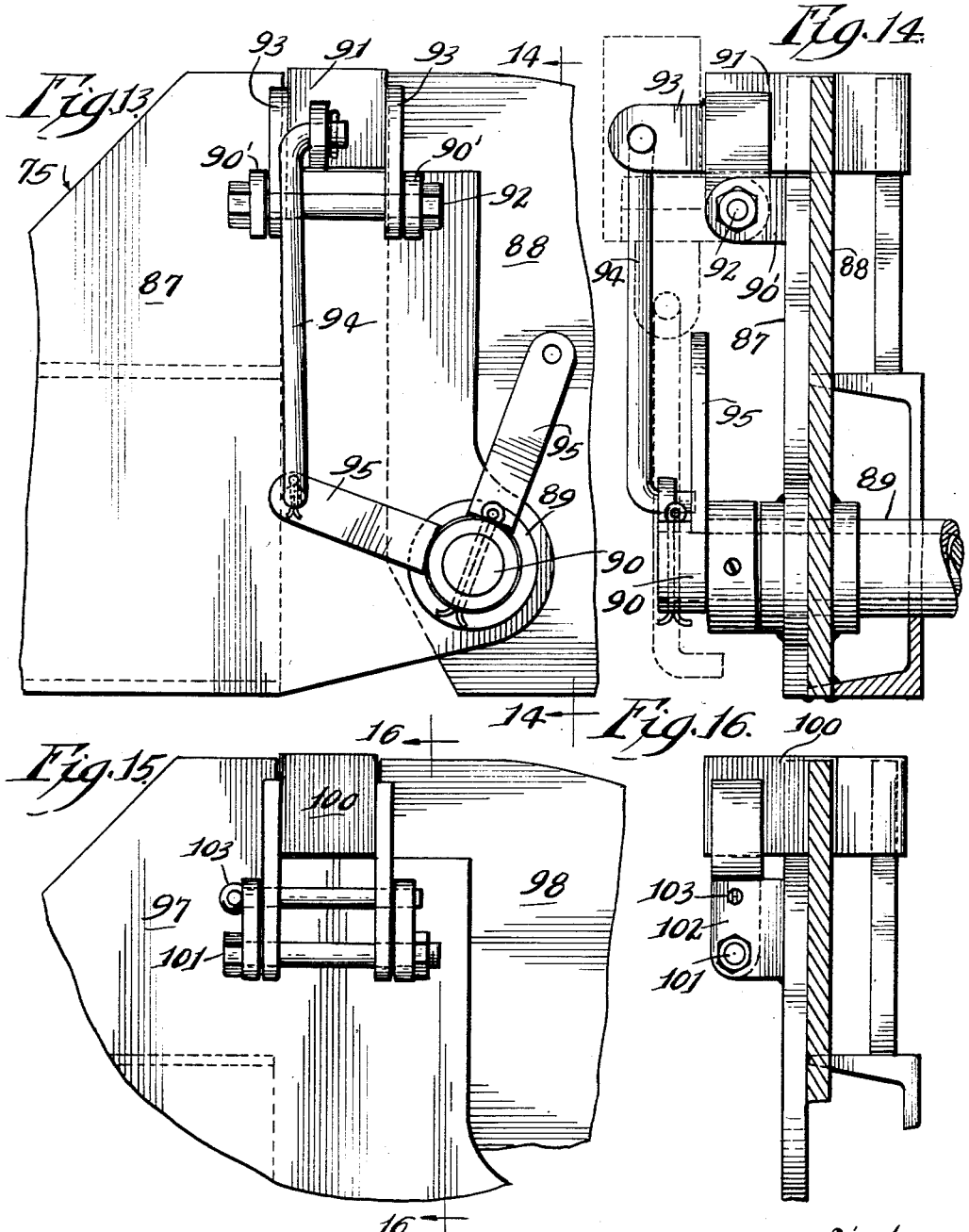

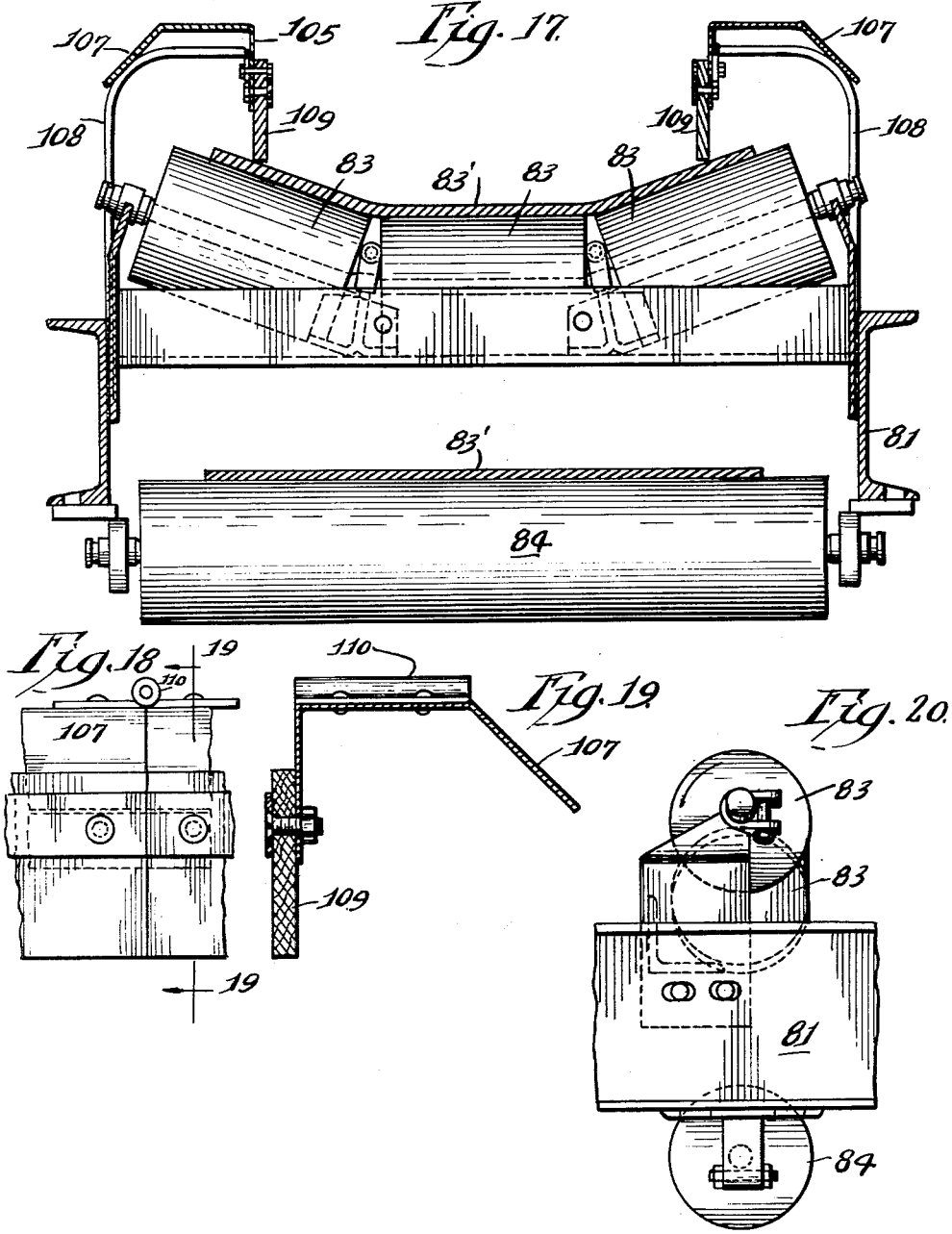

June 7, 1960  G. T. RONK  2,939,226
ELEVATING GRADERS
Filed Nov. 2, 1956  13 Sheets-Sheet 12
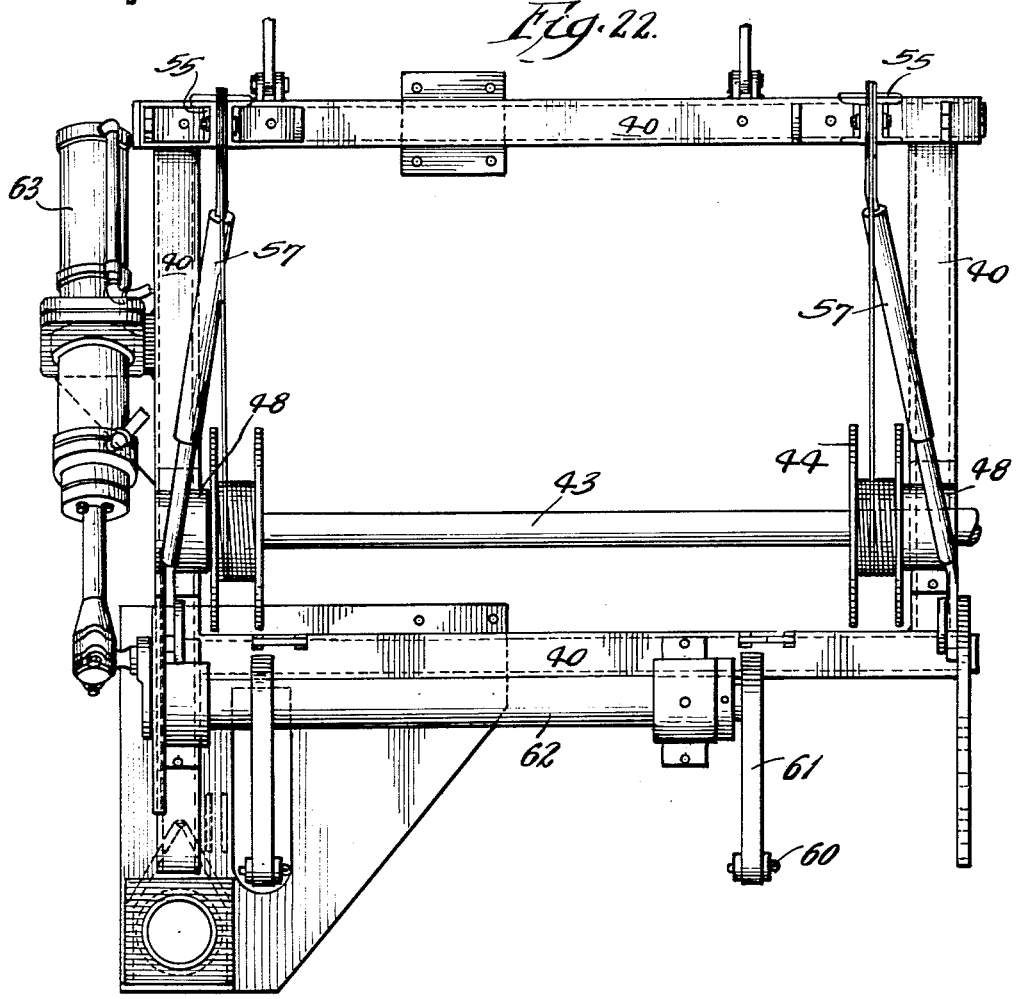

June 7, 1960　　　　G. T. RONK　　　　2,939,226
ELEVATING GRADERS

Filed Nov. 2, 1956　　　　　　　　　　13 Sheets-Sheet 13

Inventor:
Geo. T. Ronk.
By. Eugene W. Simpson.
Attorney.

United States Patent Office 2,939,226
Patented June 7, 1960

2,939,226

ELEVATING GRADERS

George T. Ronk, Cedar Rapids, Iowa, assignor to Barnard & Leas Manufacturing Co., Inc., Cedar Rapids, Iowa, a corporation of Iowa Filed Nov. 2, 1956, Ser. No. 620,135

4 Claims. (Cl. 37—110)

The elevating grader usually comprises a motor grader provided with a transverse belt conveyor and loading plow so as to load earth on the conveyor on one side of the grader, transport the earth transversely across the grader and deposit it either into a dump truck or at a point of desired use.

From the nature of the machine it is obvious that the transverse conveyor must vary from a minimum of twelve feet up to a maximum of over twenty feet, thus presenting a relatively wide machine which, unless steps are taken to remedy it, would be extremely awkward to transport in traffic.

The awkwardness of the elongated cross conveyor has been somewhat eliminated by folding the conveyor adjacent its center in a manner shown in the United States Patent to George T. Ronk, No. 2,742,140, dated April 17, 1956. Such a machine cannot be adapted to airborne operations, due, not only to its weight and dimensions, but, also to the problem of suitably securing the conveyor on the motor grader during the dropping operation.

It is an object of the present invention to provide an elevating grader which will fold into a size compatible with transporting the grader in a conventional cargo plane.

Another object is to provide a folding elevating grader in which the conveyor may be firmly secured to the motor grader during movements thereof.

Another object is to provide a folding elevating grader for use in airborne operations in which the time required to convert to operating position is reduced to a minimum.

A further object of the invention is to provide an elevating grader that can be dropped by parachute from a moving plane.

A further object is to provide an elevating grader which may be dropped by parachute from a plane, in which the danger of damage to the grader is reduced to a minimum.

A further object is to provide a folding conveyor which may be folded into a compact unit and securely locked in that position.

A still further object is to provide an elevating grader, including a folding cross conveyor, which will be strong and rigid.

Still further objects of the invention will become apparent upon considering the following specification, which, when taken in conjunction with the accompanying drawings, illustrates a preferred form of the invention.

In the drawings:

Fig. 5 is a perspective view of the grader in traveling position and ready to be loaded onto a plane;

Fig. 6 is a perspective view of the loading end of the cross conveyor, with the loading end of the conveyor lowered and the plow raised;

Fig. 7 is a side elevational view of one side of the loading end of the belt conveyor shown in Figs. 1 to 6;

Fig. 8 is a partial plan view of the loading end of the conveyor with the conveyor belt removed;

Fig. 9 is a partial plan view of the conveyor frame showing the joints on which the frame folds;

Fig. 10 is an elevational view of the portion of the frame shown in Fig. 9;

Fig. 11 is a plan view of a portion of the discharge end of the conveyor showing the drive for the conveyor belt;

Fig. 12 is an elevational view of the discharge end of the conveyor as shown in Fig. 11;

Fig. 13 is a side elevational view of the joint in the conveyor nearer the loading end thereof;

Fig. 14 is a cross-section taken on the line 14—14 of Fig. 13, looking in the direction of the arrows;

Fig. 15 is a side elevational view of the joint in the conveyor nearer the discharge end thereof;

Fig. 16 is a cross-section taken on the line 16—16 of Fig. 15, looking in the direction of the arrows;

Fig. 17 is a vertical transverse cross-section through the conveyor showing the troughing and return rollers and chute lining;

Fig. 18 is a side elevational view of the chute lining support adjacent the pivotal point thereof;

Fig. 19 is a transverse cross-section through the chute lining taken on the line 19—19 looking in the direction of the arrows;

Fig. 20 is a side elevational view of the conveyor showing the mounting of the conveyor rollers;

Fig. 21 is a vertical elevational view of the base of the sheave support posts;

Fig. 22 is a horizontal cross-section taken on the line 22—22 of Fig. 21, showing the main rectangular supporting frame, with the winding drums, the hydraulic cylinders to actuate the loading end of the conveyor, and the plow and supporting brackets;

Figure 1:
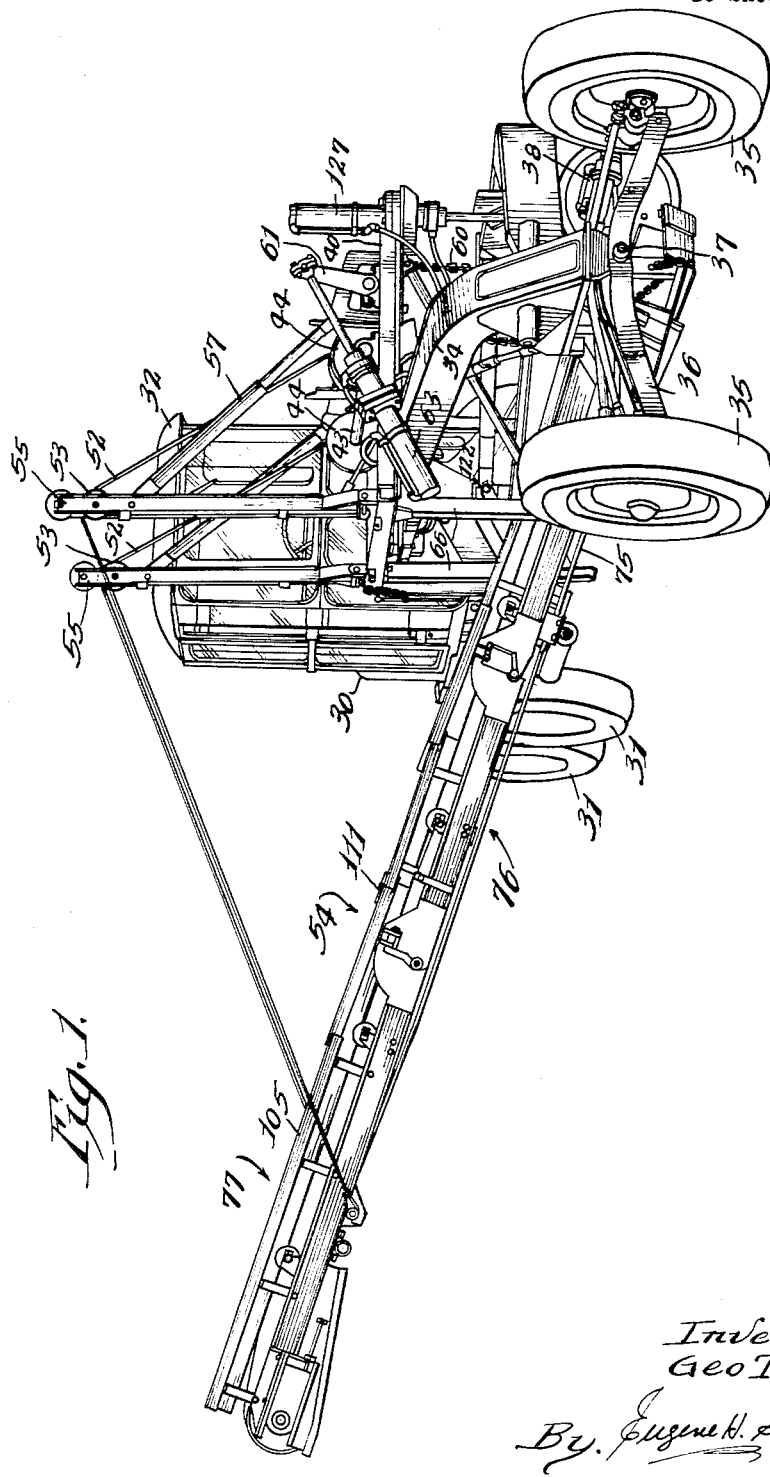
Fig. 1 is a perspective view of an elevating grader made in accordance with the present invention, showing the cross conveyor in operating position to move earth.

Referring to the drawings in which like numerals indicate like parts throughout the several views, the elevating grader is carried by a motor grader which may comprise a power unit 30 mounted on a double pair of power wheels 31—31 and a cab 32. A tongue 34 is fixed to the front end of the power unit 30 and extends forward to support a pair of wheels 35—35. The wheels 35—35 are mounted on an axle 36 and a pivot 37 so that the wheels 35—35 can accommodate themselves to uneven ground. A cylinder tilting compensator retains the wheels vertical as the axle 36 tips. The wheels are mounted on the axle so they may be turned to guide the grader in the desired direction.

A horizontal rectangular frame 40 is carried on top of the tongue 34 and is supported on brackets 42—42 (Fig. 2) welded to the tongue 34.

The horizontal frame 40 carries a pair of bearings 48—48, Fig. 22, which support a shaft 43 which has hoisting drums 44—44 fixed thereon. The shaft 43 is driven from a reversible hydraulic motor 45, Fig. 6, which drives a worm and wheel 46. The worm-wheel 46 drives a sprocket 47 which drives the shaft 43 through a chain 49. Power is supplied to the motor 45 through a pair of pressure conduits 50 controlled by the operator from within the cab 32.

The drums 44—44 carry cables 52—52 which extend from the drums 44—44 upwardly and pass over sheaves 53—53 to support the outer end of the belt conveyor, generally designated 54.

The sheaves 53—53 are mounted on posts 55—55 which preferably are made of channels back to back and spaced apart to receive the sheaves. The posts 55—55 are pivoted at 56—56 to the frame 40, and are braced by adjustable length braces 57. The braces 57 comprise a pair of telescopic members held in adjusted position by pins 58, Fig. 3. The braces 57 are connected to the posts 55 by removable pins so that the braces can be disconnected from the posts to permit the posts to be rotated on their pivots 56 into horizontal position.

The conveyor 54 which is supported adjacent its outer or discharge end in working position by the cables 52—52, is supported at its loading end by chains 60—60, best seen in Fig. 6. Raising or lowering the loading end of the conveyor 54 is accomplished by rotating the bifurcated bell crank lever 61 about its axis 62 by means of a hydraulic cylinder and piston 63, Fig. 22. The hydraulic cylinder and piston is actuated by the driver from the cab 32.

The lower or loading end of the conveyor is held in position by adjustable stays 65—65 (Figs. 4, 5, 6 and 8). The adjustable stays 65—65 are composed of telescoping tubes, connected by pins 65', and are adjustable for a working position and a traveling position. The stays 65 are connected to the frame 40 through posts 66—66 which are secured to and depend from the frame 40.

The loading end of the conveyor 54 is kept from moving longitudinally in the direction of travel by a drag chain 68 (Figs. 4 and 5) connected between a post 69 carried by a plow beam, generally designated 70, and the loading end of the conveyor 54. A second drag chain 72 (Fig. 6) is connected to the rear side of the conveyor 54 and is connected to the axle of one of the wheels 31. The two chains 68 and 72 co-operate to prevent longitudinal movement in the direction of motion of the grader in either direction.

The details of the conveyor 54 are shown in Figs. 7 to 20, inclusive. Referring to those figures it will be seen that the conveyor comprises a loading section, generally designated 75, to which is pivotally connected an intermediate section, generally designated 76, to which is pivotally connected a discharge section, generally designated 77.

The loading end of the conveyor is built between a pair of vertical plates 80—80 (Figs. 7 and 8) which serve to carry the load end of the conveyor. The side pieces of the conveyor are composed of channels 81 secured one to each plate 80. The side pieces are held in spaced relationship by spacer pipes 82 (Figs. 7, 8, 9 and 10).

The conveyor is provided with troughed rollers 83 to give a concave surface to a belt 83' (Fig. 17). On the return flight the belt is supported on a plurality of cylindrical rollers 84.

A joint or hinge, generally designated 85, is provided at the outer end of the loading section. This joint 85 may be of the semi-automatic type shown in the U.S. patent to George T. Ronk, issued May 8, 1956, Patent No. 2,744,615.

The joint 85 is shown in Figs. 9 and 10 and in detail in Figs. 13 and 14.

The joint 85 comprises a pair of hinge plates 87—87, one of the plates 87 being welded onto each of the outer free edges of the channels 81—81 and a pair of hinge plates 88—88, one of the plates 88 being welded in recesses in corresponding channels 81'—81' of the intermediate section of the conveyor so that the plates 88 may pass between the plates 87 as the conveyor is folded.

A hollow shaft 89 forms a pivot for the point and receives a lock actuating shaft 90.

A pair of ears 90' are secured to each of the plates 87, each pair of ears mounting a locking block 91 on a pivot 92. The locking blocks 91 pass between the hinge plates 87 and 88 and seat in a recess in the plate 87 to prevent folding of the conveyor.

To actuate the locking blocks 91 an ear 93 is provided on each of the blocks 91 which is engaged by a pull rod 94 to lift the blocks out of locking position. Both locking blocks 91—91 are actuated simultaneously by a pair of bell crank levers 95 fixed on the shaft 90 at each end thereof. The bell crank levers 95 are actuated from the cab 32 of the motor grader by a cable (not shown) attached to the free end of the lever 95.

Referring again to Figs. 9 and 10, it will be seen that the center section of the conveyor 76 is a continuation of the loading section, the center section terminating in a hinge and lock 96, shown in detail in Figs. 15 and 16.

Referring to Figs. 15 and 16, the hinge 96 comprises a pair of plates 97—97 fixed on the outer free ends of the channels 81' in a manner similar to the plates 87, and a pair of plates 98—98 welded in recesses of the channels on the discharge section of the conveyor. The plates 97—97 and 98—98 are hinged together on a common pivot 99 (Fig. 10).

A pair of locking blocks 100—100 are mounted on pivots 101—101 and are adapted to be interposed between the plates 97 and 98 to prevent further rotation of the sections. The pivots are carried from the plates 97—97 by a pair of ears 102 welded thereto. In order to prevent accidental disengagement of the blocks 100—100 during folding of the conveyor, cotter pins 103 pass through the ears 102 and through the locking blocks 100 to secure the blocks in locked position.

The conveyor 54 is provided with a chute lining, generally designated 105, which retains the earth being moved by the conveyor in the central portion of the belt and prevents it falling over the sides thereof. Details of the chute lining are shown in Figs. 17, 18 and 19.

Referring to Fig. 17, the chute lining comprises an elongated canopy 107 extending over the edge of the conveyor belt and secured to the channels 81, 81' and 81" by brackets 108. A guard board 109 depends from the canopy 107 to a point adjacent the belt 83' and is made adjustable thereon to accommodate wear of the board.

At points adjacent the hinges 85 and 96 the chute lining is made foldable so as to accommodate the folding of the conveyor sections. The folding is accomplished by having the canopy 107 hinged at 110 and having the guard board offset to permit passage of the adjacent board.

Figure 2:
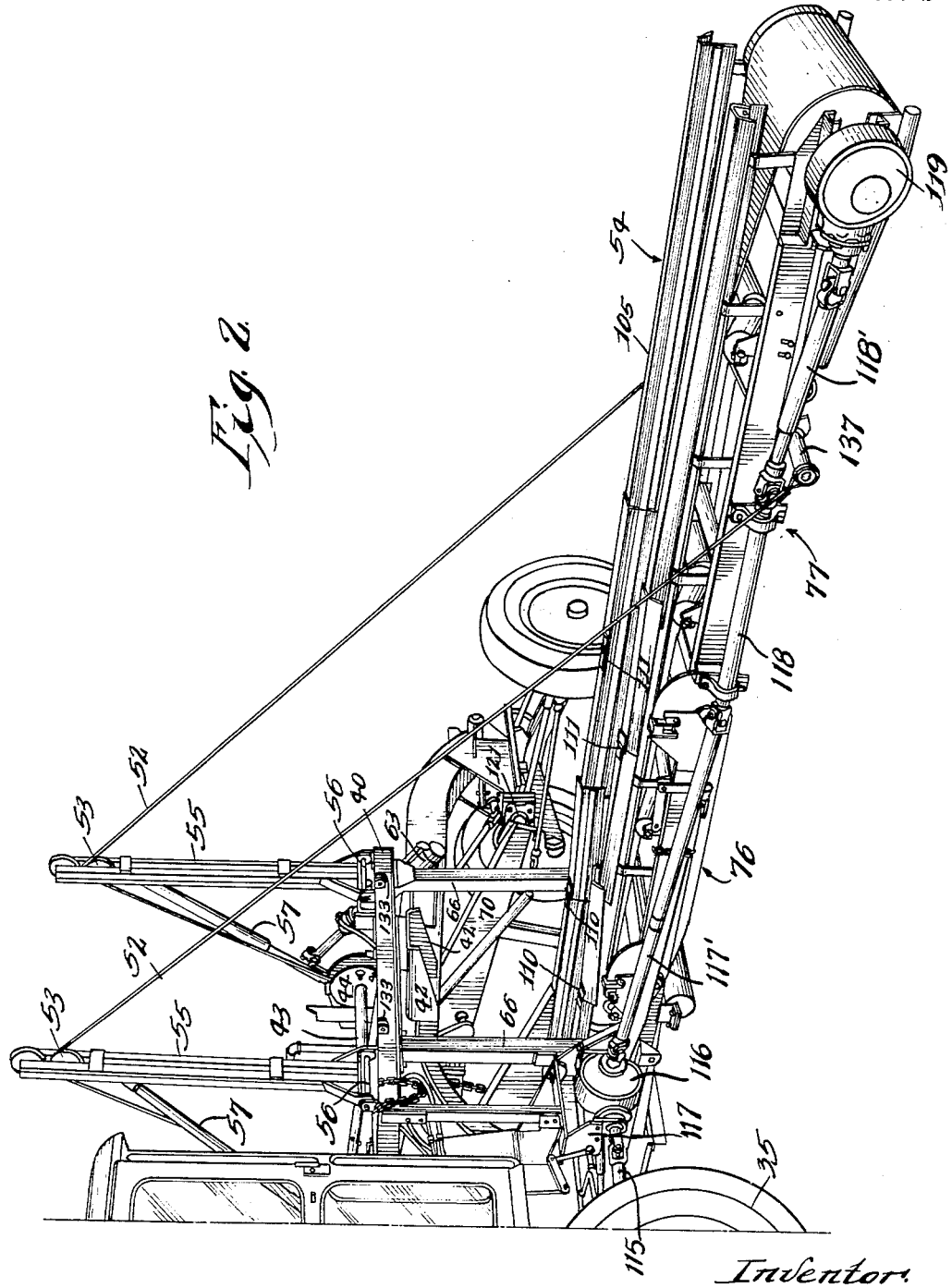
Fig. 2 is a perspective view with the cross conveyor in operating position, similar to Fig. 1.

The power to operate the conveyor 54 is taken from a power take-off connection of the motor grader through a power shaft 115. The power shaft 115 drives a bevel gear which drives a second bevel gear housed in a rotatable housing, or gear box, 116 (Fig. 2). The housing 116 is carried on a frame 117 mounted between bearings and is joined to the loading section 75 of the conveyor by a torque arm 117' having telescoping members to allow for the position of the conveyor in the grader. The adjustable torque arm 117' serves to turn the housing 116 so as to give substantially direct drive from the housing 116 through a transmission shaft 118 to a forward gear box 119.

The shaft 118 contains a spline 118' permitting variations in length of the shaft 118 during folding of the conveyor.

The earth is moved onto the conveyor 54 by a plow, generally designated 120 (Fig. 6), which is carried by the plow beam 70. The plow beam 70 is connected by a ball and socket joint 121 (Fig. 2) to the forward end of the tongue 34 and is pivotally connected to a bracket 122 (Fig. 1) on the rear end of the tongue. A vertical post 123, braced by diagonal 124, carries the plow disc 125.

A hydraulic piston and cylinder 127 is provided on the frame 40 to control the position of the plow disc 125. Control of the piston 127 is effected from the cab 32 of the grader.

*Operation*

The machine being first in operating or unfolded position and it being desired to fold the machine into position to transport it in its most compact form, the plow disc 125 is first removed from the post 123 and secured, preferably in the cab 32, or other convenient place.

The hydraulic piston and cylinder may then be used to raise the plow beam 70.

Before starting to fold the conveyor, the operator secures a beam 130 (Fig. 5) to and between the depending ends of the posts 66 to form a support for the joint 85 of the conveyor.

The pins 65' are then removed from the stays 65, permitting the cables 52 to push the loading end of the conveyor further under the grader, or to the right as seen in Fig. 5, and the pins 65' are reset in this position.

The cables 52 may then be slackened allowing the portion of the grader adjacent the hinge 85 to rest on the beam 130, and the loading end of the conveyor is raised by proper manipulation of the piston and cylinder 63 to raise the loading end of the conveyor into a level position.

The discharge end of the conveyor may then be lowered below the level of the loading section, separating the elements of the hinge 85, permitting the grader operator to pull the bell crank lever 95 toward the left, as seen in Fig. 13, to remove the locking blocks 91' from between the plates 87 and 88. The discharge end of the conveyor 54 may then be hoisted by means of the cables 52 until the forward two sections of the conveyor are vertical, the position being that shown in Fig. 3.

Figure 3:
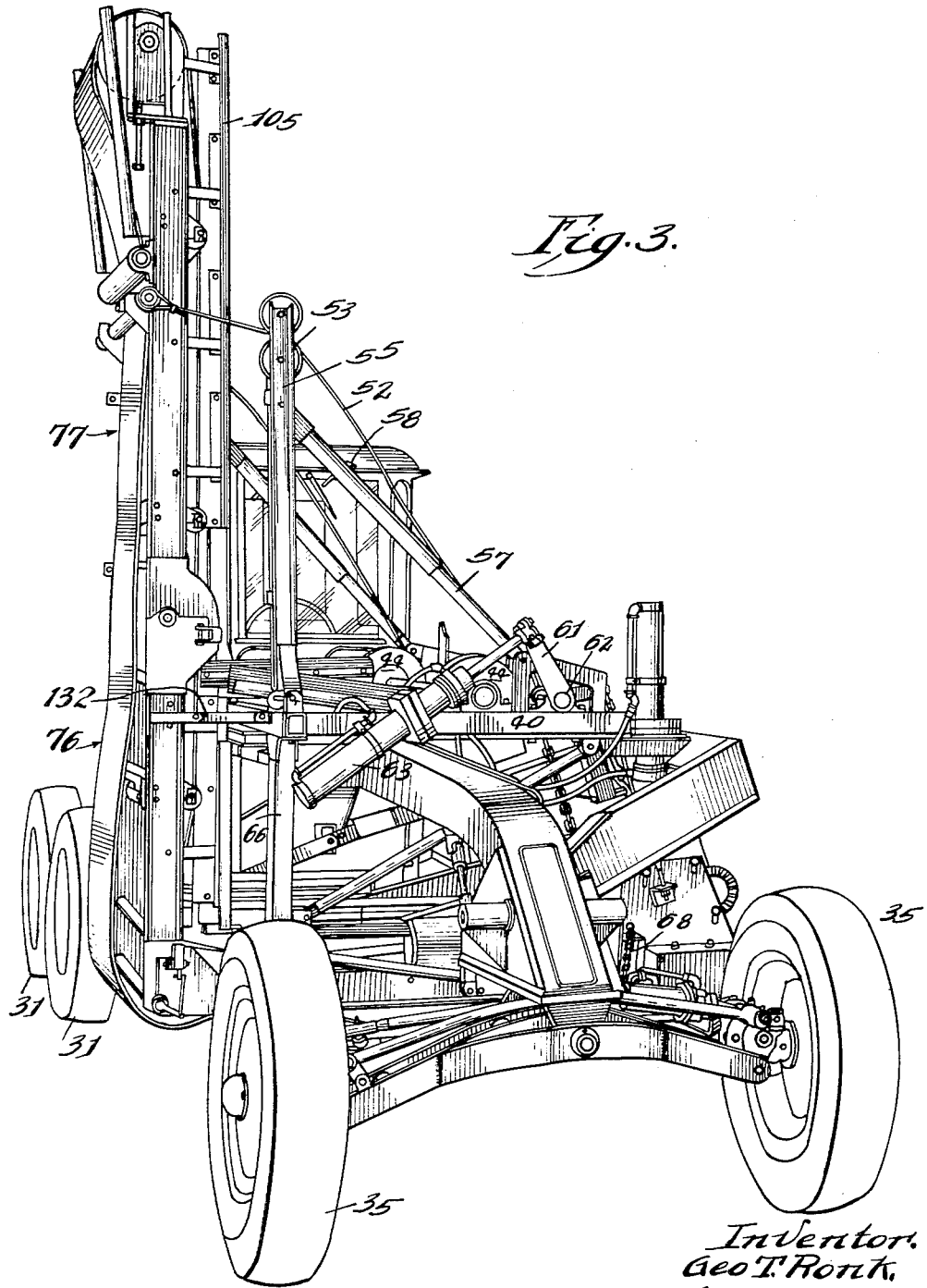
Fig. 3 is a perspective view of the grader, shown in Fig. 1, but showing the cross conveyor in partially folded position for traveling.

When the conveyor is in the position shown in Fig. 3, a pair of links 132—132, which are pivotally connected to the sides of the conveyor (Figs. 2 and 3), are connected to ears 133—133 on the adjacent side of the frame 40 by pins, thus serving to secure the center section of the conveyor in vertical position.

Figure 4:
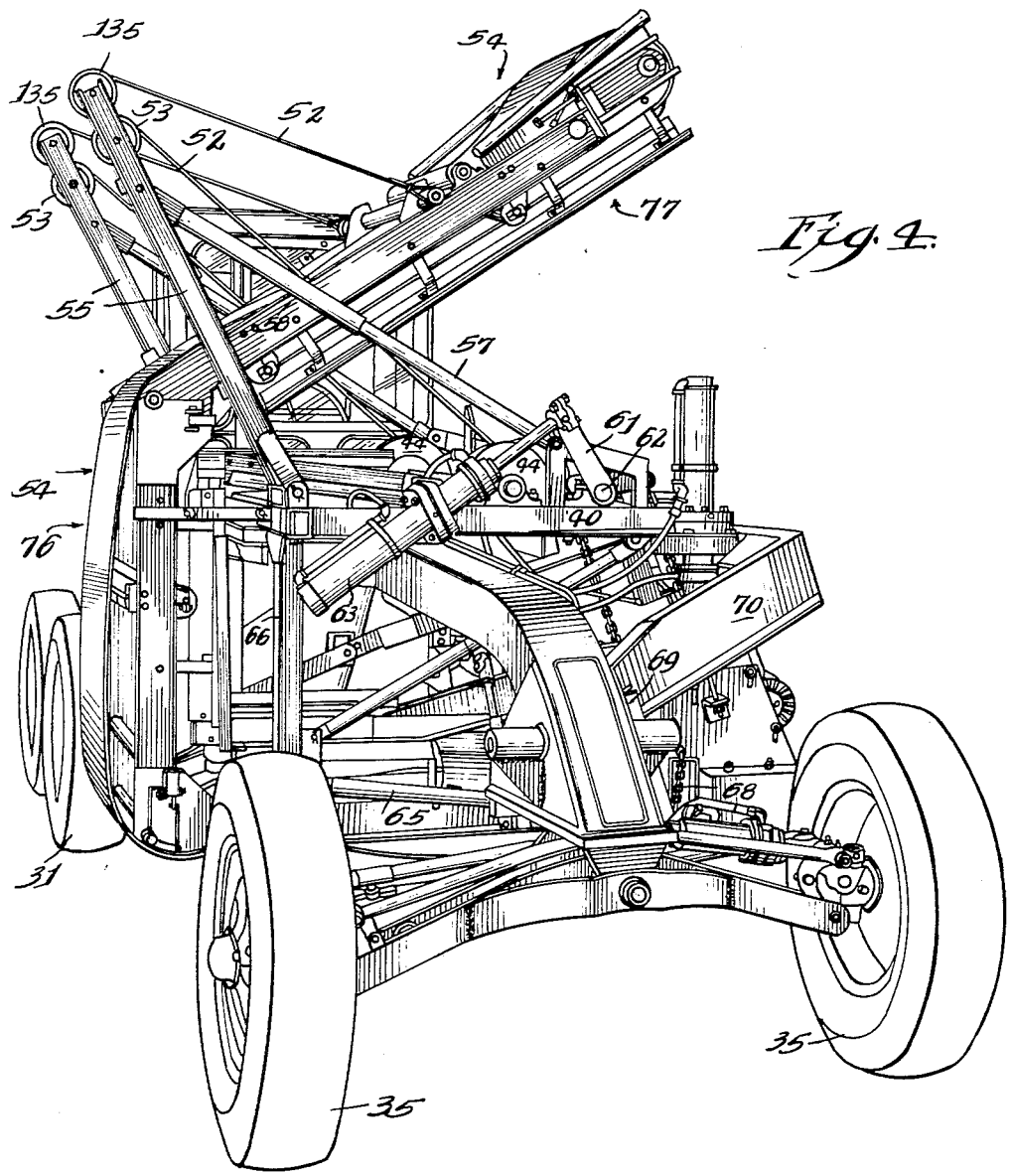
Fig. 4 is a perspective view of the grader illustrating a further step in folding the conveyor into position for traveling in an airplane.
Figure 23:
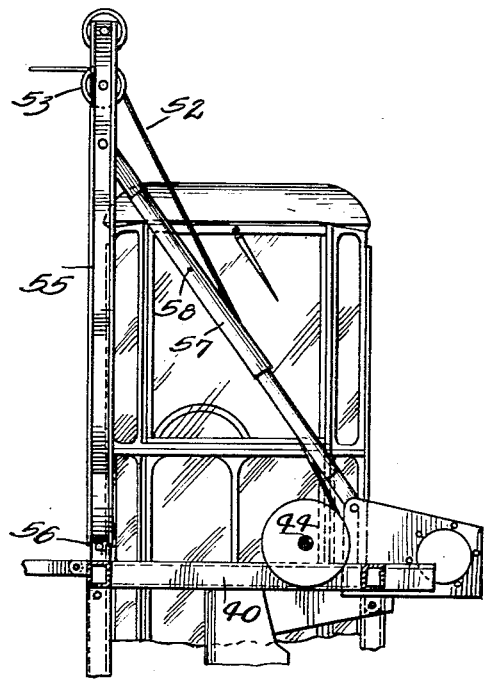
Fig. 23 is a front elevational view showing the sheave support posts and the winding drum.
Figure 24:
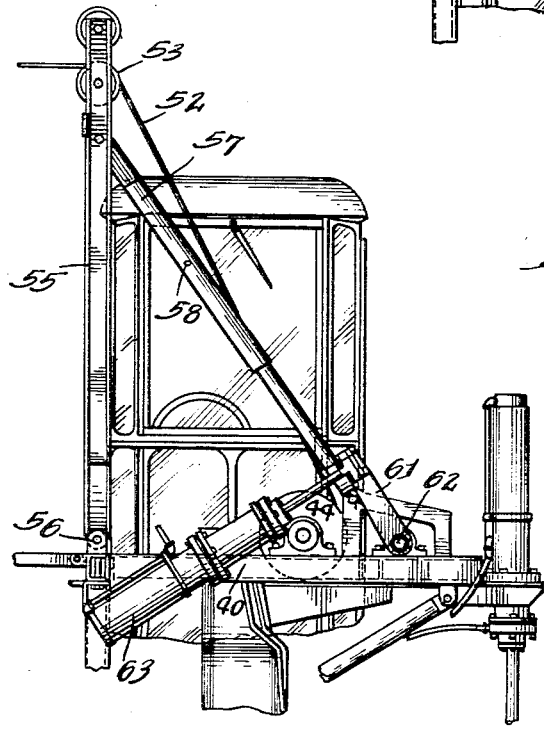
Fig. 24 is a front elevational view similar to Fig. 23, but showing in addition the actuating cylinders for the front end of the conveyor and for the plow.

To fold the discharge end of the conveyor 54 into horizontal position, the cables 52 are slackened somewhat and the adjustable braces 57 are lengthened slightly to a position shown in Fig. 4. The position of the cables 52 is then altered so that they pass over a second pair of sheaves 135 mounted between the outer ends of the posts 55—55.

The cables may then be tightened slightly in order to separate the elements of the hinge 96 permitting the cotter pins 103 to be removed and the locking blocks 100 to be removed from between the hinge plates 97 and 98.

Further slackening of the cables 52 through the use of the hydraulic motor 45 lowers the discharge end of the conveyor into its horizontal position on the top of the frame 40 (Fig. 5).

When the discharge section 77 of the conveyor 54 is resting on the frame 40, the pins are removed from the posts 55 releasing the braces 57 and the posts and braces are placed in horizontal position as shown in Fig. 5. When the posts 55 are thus folded, further tightening of the cables 52 draws the conveyor support rod 137 down on top of the conveyor and posts and locks the entire conveyor in rigid folded position.

To prepare the folded conveyor for moving earth, the cables 52 are slackened and placed over the sheaves 135 and the posts 55 are raised and secured in the position shown in Fig. 4. The hydraulic motor 45 is then operated to hoist the discharge section 77 into vertical position in alinement with the intermediate section 76 of the conveyor. Further movement of the cable spreads apart the hinge plates 97 and 98 and permits the locking block 100 to be inserted between the hinge plates and secured by the cotter pin 103.

Tension is then relieved on the cables and the length of the braces 57 is adjusted through the pins 58 so that the posts 55 are vertical, as seen in Fig. 3. The cables may then be drawn up relieving the tension on the links 132, and the links disconnected from the ears 133.

The center section 76 and the discharge section 77 may then be lowered by the cables 52, the sections 76 and 77 pivoting on the joint 85 until the discharge end of the conveyor rests on the ground. When the discharge end of the conveyor rests on the ground the hinge plates 87—88 are spread apart, permitting the operator in the cab 32 to actuate the lever 95 and insert the locking block 91' in place between the plates 87—88.

The two sections 76—77 may again be raised off the ground until the entire conveyor is alined, after which the entire conveyor will pivot about the loading end of the link 65 and raise off the beam 130. When the weight of the conveyor 54 is removed from the beam 130 the beam may be removed from between the posts 66.

After the beam 130 has been removed the conveyor 54 is again lowered until the discharge end rests on the ground. At this point the pin 65' may be removed from the expansible link 65.

With the discharge end of the conveyor resting on the ground, the cables 52 slack, power is applied to the conveyor belt which causes the conveyor to move or walk outward. When the conveyor moves to the left (as seen in Fig. 1) to come into operating position the pin 65' is inserted through the brace 65 (Fig. 6), and the loading end of the conveyor may be lowered by releasing hydraulic pressure from the cylinder 63 causing the bell crank lever 61 to rotate on its axis and lower that end of the conveyor. The cables 52 may then be drawn up by operating the motor 45 and the discharge end of the conveyor raised to any desired height.

When the loading end of the conveyor 54 is in its lowered position the disc plow blade 125 may be secured on the post 123 and the plow frame 120 lowered by releasing pressure from the cylinder 127.

It will be realized from the foregoing description that the present invention discloses an elevating grader which may be folded into a compact unit for air transportation, or other uses, and which may be re-assembled rapidly into operating position.

It will also be realized that the herein disclosed form of the invention is given merely as a preferred example thereof, and that various changes in size, shape and arrangement of parts may be made without departing from the spirit of the invention or the scope of the subjoined claims.

That which is claimed as new and is desired to be secured by United States Letters Patent is:

1. An elevating grader comprising a motor grader, a horizontal frame carried by said motor grader, a belt conveyor comprising a loading section, an intermediate section and a discharge section, hinges joining said loading section with said intermediate section and said intermediate section with said discharge section, means connected with said hinges to retain said sections alined with each other, means to render said last named means ineffective and permit the sections to fold relative to each other, means to support the loading section in horizontal position beneath said frame, means to support the intermediate section in vertical position adjacent one end of the frame and means to support the discharge section in horizontal position above said frame while traveling.

2. An elevating grader comprising a motor grader, a horizontal frame carried by said motor grader, a pair of posts pivotally carried by said frame, means to support said posts in a plurality of positions, a belt conveyor comprising a loading section extending across said grader and beneath said frame, an intermediate section and a discharge section, hinges joining the loading section with the intermediate section and the intermediate section with the discharge section, means to raise said loading section from loading position to carrying position and, means, including said posts in one position to raise the intermediate section and the discharge section into vertical position, said last named means including said posts in another position to lower the discharge section into a horizontal carrying position above said frame.

3. An elevating grader comprising a motor grader, a horizontal frame carried by said motor grader, a pair of posts pivotally carried by said frame, means to support said posts in a plurality of positions, a belt conveyor comprising a loading section extending across said grader and beneath said frame, an intermediate section and a discharge section, hinges joining the loading section with the intermediate section and the intermediate section with the discharge section, means to raise said loading section from loading position to carrying position, means including said posts in one position to raise the intermediate section and the discharge section into vertical position, said last named means including said posts in another position to lower the discharge section into a horizontal carrying position above said frame, and means to lock the conveyor in carrying position on the grader.

4. An elevating grader comprising a motor grader, a horizontal frame carried by said motor grader, a pair of posts pivotally carried by said frame, means to support said posts in a plurality of positions, a belt conveyor comprising a loading section extending across said grader and beneath said frame, an intermediate section and a discharge section, hinges joining the loading section with the intermediate section and the intermediate section with the discharge section, means to raise said loading section from loading position to carrying position, means, including said posts in one position to raise the intermediate section and the discharge section into vertical position, said last named means including said posts in another position to lower the discharge section into a horizontal carrying position above said frame, and means including said posts in another position to lock the conveyor in carrying position on the grader.

References Cited in the file of this patent

UNITED STATES PATENTS

| | | |
|---|---|---|
| 406,788 | Sprague | July 9, 1889 |
| 1,027,505 | Rosenthal | May 28, 1912 |
| 1,196,886 | Rodebaugh | Sept. 5, 1916 |
| 2,157,968 | Richwine | May 9, 1939 |
| 2,742,140 | Ronk | Apr. 17, 1956 |

FOREIGN PATENTS

| | | |
|---|---|---|
| 150,611 | Australia | Mar. 24, 1953 |